March 9, 1965     H. N. EKLUND     3,172,213
NORTH SEEKING GYROSCOPE

Filed Feb. 23, 1960     4 Sheets-Sheet 1

*INVENTOR.*
HARRY N. EKLUND

March 9, 1965 H. N. EKLUND 3,172,213
NORTH SEEKING GYROSCOPE
Filed Feb. 23, 1960 4 Sheets-Sheet 2

INVENTOR.
HARRY N. EKLUND

March 9, 1965 H. N. EKLUND 3,172,213
NORTH SEEKING GYROSCOPE
Filed Feb. 23, 1960 4 Sheets-Sheet 3

INVENTOR.
HARRY N. EKLUND

March 9, 1965  H. N. EKLUND  3,172,213
NORTH SEEKING GYROSCOPE
Filed Feb. 23, 1960  4 Sheets-Sheet 4

*INVENTOR.*
HARRY N. EKLUND

United States Patent Office 3,172,213
Patented Mar. 9, 1965

3,172,213
NORTH SEEKING GYROSCOPE
Harry N. Eklund, Pacific Palisades, Calif., assignor, by mesne assignments, to Lear Siegler, Inc., Santa Monica, Calif., a corporation of Delaware
Filed Feb. 23, 1960, Ser. No. 10,485
10 Claims. (Cl. 33—226)

This invention relates to surveying instruments and, in particular to a gyroscope instrument for determining the direction of geographic north.

It is well known that the earth rotates about its axis at 15° per hour. A pendulous gyroscope upon the earth's surface having its spin axis horizontal tends to precess under earth's rotation so as to align its spin axis with astronomical north, provided the gyroscope is given angular freedom about the vertical axis.

However, complete advantage has not heretofore been taken in surveying of this action of the gyroscope because of the difficulty attendant upon isolating the precession torque applied to the gyroscope by earth's rate, as distinguished from that applied by error torques, such as friction in the suspension. Furthermore, these torques become all the more difficult of distinction if the suspension employed requires damping.

It has heretofore been proposed to float a gyroscope in a container and permit the gyroscope spin axis to oscillate about the meridian and to determine the center of the oscillation, which is used as a measure of true north. Because of the inherent damping process, several problems have arisen in connection with such construction. First of all, the fluid required to float the gyroscope adds undesirable weight to the instrument. Also, the fluid requires a means for controlling the temperature of the fluid when the instrument is operated under varying temperature conditions. The adding of heat to the water or other liquid used to float the gyroscope, produces convection currents which themselves tend to produce torque upon the gyroscope of sufficient magnitude to lead to objectionable error. In addition, the presence of the fluid needed to float the gyroscope produces damping about the vertical axis which necessitates averaging of the oscillation amplitudes relative to the center of oscillation with due regard to the effect of the reduction in amplitude with time due to damping. By the present invention the flotation fluid is entirely eliminated and the gyroscope is suspended by a single vertical band which supports the gyroscope pendulously with its spin axis free to rotate in a horizontal plane, while the motion in the vertical plane is partially restrained by the pendulosity of the gyroscope. A container is provided to surround the gyroscope proper, and from the inside upper end of this container the suspension band is supported. To eliminate virtually all of the various sources of stray torques, the container itself is accurately servoed to follow the oscillations of the gyroscope in the horizontal plane. The container is hermetically sealed and filled with hydrogen or any other suitable gas. Hydrogen has a rather high thermal conductivity as compared to air, which greatly promotes the heat transfer from the gyroscope to the container wall, while the very low density of hydrogen as compared to air greatly reduces the effect of convection currents on the gyroscope motion. The gyroscope is not damped about the vertical axis but is damped against translational movement in a horizontal plane by the use of magnets or fluid damping.

This invention contemplates a gyroscopic instrument wherein all conventional sources of error are eliminated so that the gyroscope precesses only in response to earth's rotation. This results in a symmetrical oscillation of the gyroscope about the meridian plane. Hence, by bisecting the angle formed by the maximum excursions of the spin axis of the gyroscope, the true indication of the meridian, i.e., of the geographic north, is obtained as the direction of the bisector itself.

It is an object of this invention to provide an improved gyroscopic instrument for determining geographic north.

It is another object of this invention to provide a suspension for a quasi-single-degree-of-freedom gyrosope which eliminates frictional precession forces.

It is another object of this invention to provide a gyroscope which is band suspended from a support which, itself, is constrained to follow the motion of the gyroscope.

It is another object of this invention to provide a meridian-seeking gyroscope in which every motion, but that connected with the torsional mode about the vertical axis, is damped.

Other objects of invention will become apparent from the following description taken in conjunction with the accompanying drawings, in which FIGURE 1 is an elevational view partially in section of the invention;

Figure 1:
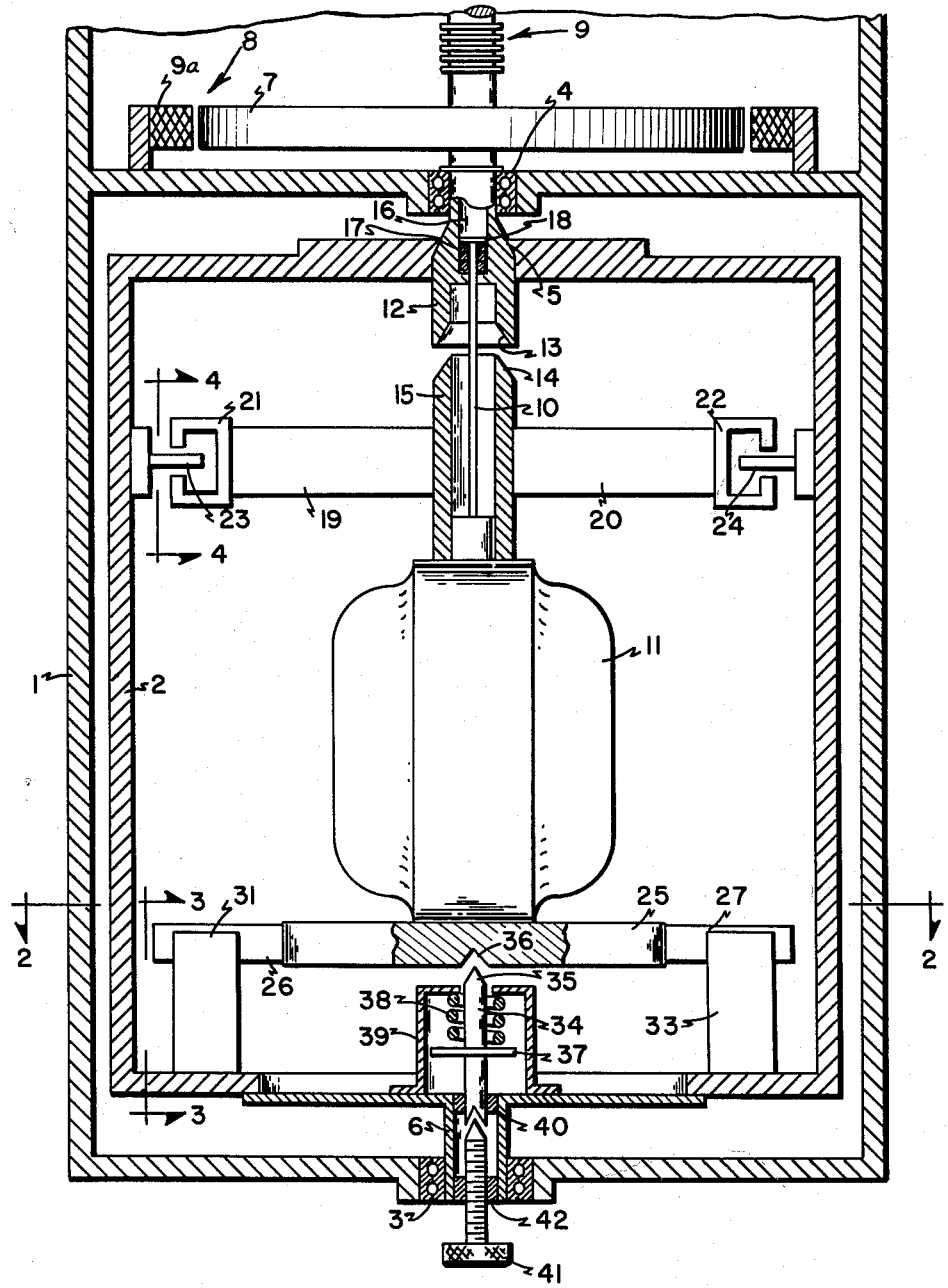

Referring now to the drawings, and in particular to FIGURE 1, a casing 1 is supported upon the earth or other earth-bound structure by a tripod or other conventional means which are not shown. Within casing 1 is supported a container 2 which is free to rotate upon bearings 3 and 4 fitted to the lower and upper ends of case 1. respectively. Stub shaft 5 fits in bearing 4 and is structurally connected to container 2 at the top thereof. Collar 6 rotates in bearing 3 and is structurally affixed to the lower end of container 2, as shown.

Stub shaft 5 extends through bearing 4 and supports rotor 7 of a torque motor 8, stator 9a of which is fixed to the case 1. Torque motor 8 is a conventional two-phase torque motor for applying torque to container 2 in a manner to be hereinafter explained. Shaft 5 is a hollow shaft and carries on its outer-upper extremity a number of slip rings 9 used for carrying signal currents and power to and from the structure within container 2. Suspension band 10, which may be constituted by a thin metal wire, is supported in the lower end of shaft 5, and, in turn, supports gyroscope 11 pendulously with the spin axis of gyroscope 11 horizontal when the gyroscope is not running. The lower end of shaft 5 is swaged to form a hollow tube 12 having a concave beveled surface 13, as shown. This surface mates with a similar convex surface 14 on tube 15 which is attached to gyroscope 11. In actual practice the bevel of surface 13 may be made greater (i.e. having a greater effective radius of curvature) than the bevel of surface 14 so as to allow substantially a line contact between the tube 15 and shaft 5, near the extreme end of tube 15, when the two are forced together. The surfaces 13 and 14 may also be conical as shown in FIG. 1. Also, within the shaft 5 is a cylindrical opening 16 which accommodates the spring 17 and the flanged head 18 of band 10. The spring 17 maintains a tension on band 10 when the surfaces 13 and 14 are made to contact for the purpose of "caging" the gyroscope 11. Tube 15 also carries transverse pick-off arms 19 and 20 to which are attached electromagnets 21 and 22. Situated opposite magnets 21 and 22 are pick-off coils 23 and 24 mounted upon the inner surface of container 2.

At the lower extremity of gyroscope 11 is carried ballast weight 25, preferably of cylindrical shape, to which are attached four electrically conducting vanes 26, 27, 28 and 29, whose function is to perform damping of the gyroscope in a plane perpendicular to the longitudinal axis of the suspension band 10 in conjunction with permanent magnets 30, 31, 32 and 33 affixed to the bottom of container 2. It is to be noted that if a greater damping force is desired, the ballast may be replaced by large permanent or electromagnets thereby replacing the small permanent magnets 30, 31, 32 and 33. Note also that in such case vanes 26, 27, 28 and 29 have to be mounted on the container 2 to provide relative motion between the vanes and the magnets. Replacing the ballast with the magnet causes the magnet to serve a dual purpose, ballast and damping, thereby reducing the parasitic weight of the instrument.

Extending through collar 6 is a plunger 34 having a pointed tip 35 adapted to fit in concavity 36 formed in the bottom of ballast weight 25. Plunger 34 carries a collar 37 which works against a compression spring 38 held in place by housing 39 attached to the bottom of container 2. Plunger 34 is sealed from the outside atmosphere by a seal member 40 and may be adjusted in vertical position by the use of caging screw 41 operating in nut 42 permanently fixed to the inside of collar 6. Note that again in actual practice the surfaces 35 and 36 may be made so that when brought together only a point contact exists.

Figure 5:
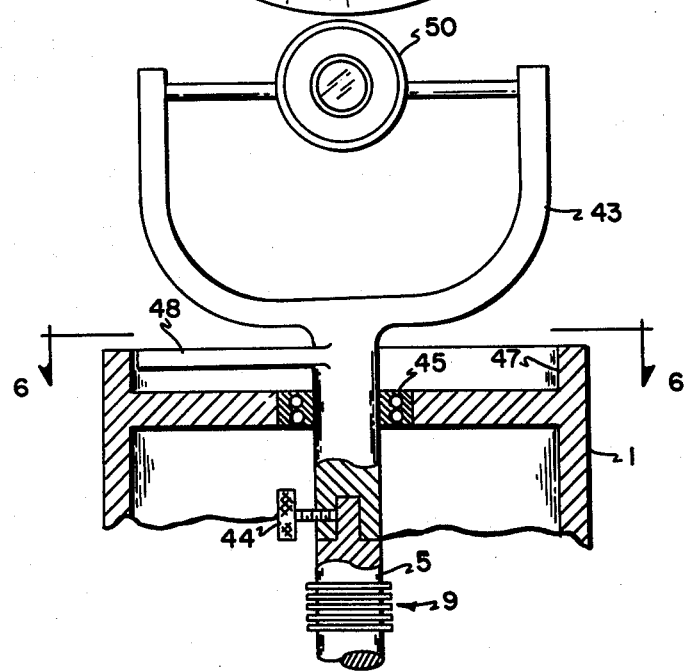
FIGURE 5 is an elevational view, partially in section, of the read-out apparatus of the invention.

A yoked shaft 43 is connected to shaft 5 and held thereto by screw 44. The shaft 43 is further supported by bearings 45 in case 1 as shown in FIGURE 5. Markings 46 are printed on the flanged portion 47 of case 1. A pointer 48 is fixed to the yoked shaft 43 and rotates with shaft 43. Pointer 48 has index marking 49 on one end thereof. A theodolite 50 is mounted in the yoke of shaft 43.

Figure 7:
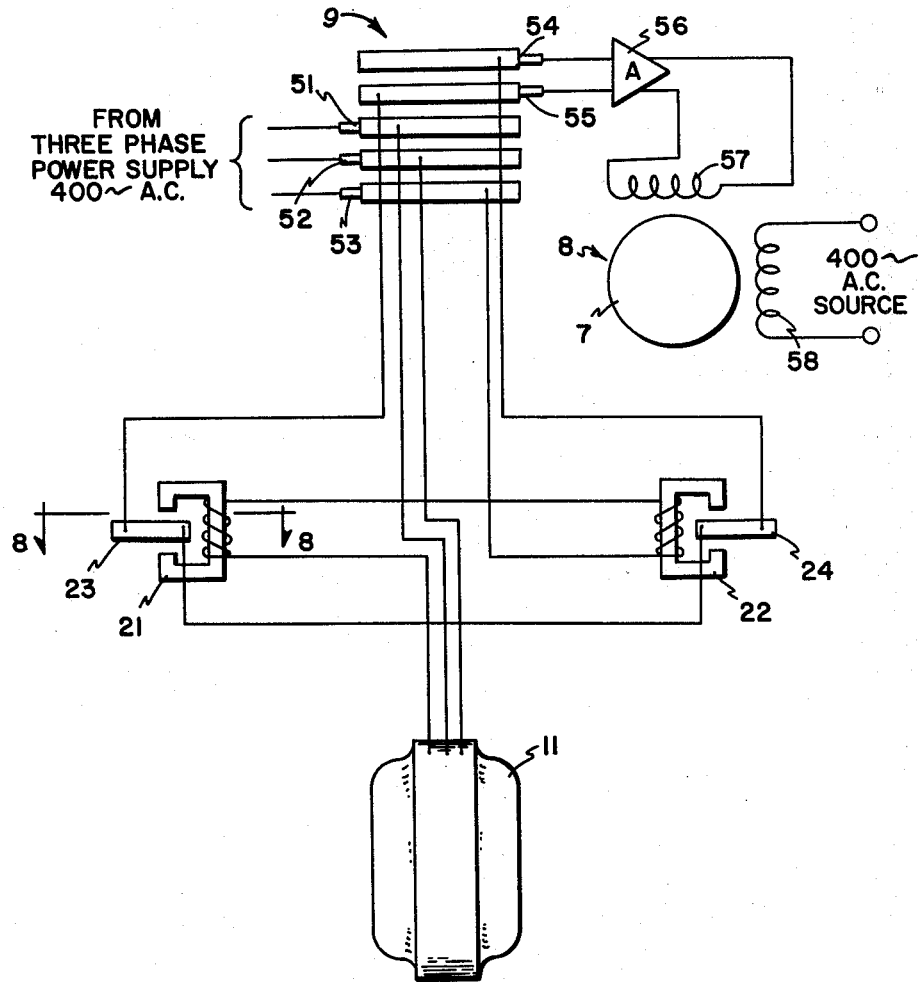
FIGURE 7 is a circuit diagram of a portion of the invention.
Figure 8:
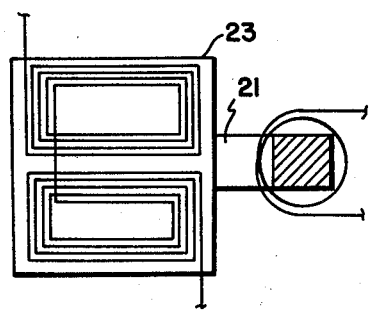
FIGURE 8 is an exploded sectional view of the invention taken at 8—8 of FIGURE 7.

Referring now to FIGURES 7 and 8, a three-phase 400 cycle alternating current is connected to three of the slip rings 9 by brushes 51, 52 and 53. Two phases of the three-phase power are directly connected to the motor (not shown) to drive gyroscope 11. The third phase passes through a lead which is wound around the electromagnets 21 and 22 to set up an alternating flux field across the gaps of the magnets 21 and 22. The third is then connected also to the motor of gyroscope 11. Signals generated in pick-off coils are taken from the slip rings 9 by brushes 54 and 55 and are fed to amplifier 56. The output of amplifier 56 is connected to the variable phase 57 of two-phase motor 8, the fixed phase 58 being fed from a source of 400 cycle alternating power. The amplifier 56 contains suitable stabilizing networks so that the torque motor 8 is caused to rotate in phase with the gyroscope motion and to reduce the error at pick-off 23 and 24 to zero, rapidly and without undue oscillation. As shown in FIGURE 8, the pick-offs 23 and 24 are wound such that if the coils deviate from the center of the gap of magnets 21 and 22 an electromotive force is developed in the pick-off coils. Note that each pick-off has two windings. One pick-off would be sufficient; however, two are used in this illustration to provide a greater magnitude of signal and also to balance the suspension. Also, it is possible to have only one coil on each pick-off.

Referring to the drawings, and in particular to FIGURE 1, the whole instrument is supported upon a tripod or other fixed support, not shown, and is leveled so that the axis of suspension band 10 coincides with the vertical axis of the container 2. Current for the motor windings of gyroscope 11 is fed in a conventional manner through slip rings 9, and as soon as the gyroscope is operable, set screw 41 is rotated to withdraw pin 34 and uncage the gyroscope. If the spin axis at that instant lies in any direction other than true north and south, under the action of earth's rotation the gyroscope precesses in whatever direction is necessary to bring the spin axis more nearly in a north-south direction. The normal action of the gyroscope and its attached mass is to precess beyond true north by an angle roughly equivalent to the angular displacement from due north at which the gyroscope was started. Thus, the gyroscope tends to oscillate about the meridian, and it is necessary either to wait until the gyroscope's motion is gradually damped and the gyroscope comes to rest with the spin axis in true north, or to observe the extreme excursions of the gyroscope in either direction by means of the pointer 48 and the reading of scale 45 attached to casing 2.

*The follow-up system*

As soon as the gyroscope commences to precess about its vertical axis, a slight displacement of electromagnets 21 and 22 with respect to pick-off coils 23 and 24 occurs. Now electromagnets 21 and 22 are fed from the same source of 400 cycle alternating current which is used to drive the motor of gyroscope 11. These electromagnets are connected in series across one phase of the three-phase alternating current power which is fed to gyroscope 11 through slip rings 9. Pick-off coils 23 and 24 are connected in series opposition as shown in FIGURE 7 so that the phase and amplitude of the net output signal is proportional to the direction and magnitude of displacement of gyroscope 11 with respect to casing 2. This signal is amplified in amplifier 56 and is fed to the variable phase winding of torque motor 8 which responds by rotating casing 2 in the sense necessary to reduce the pick-off signal to zero thereby tending to eliminate twisting of the suspension band and consequent deleterious effect on the motion of the suspended encased gyroscopes as the gyroscope oscillates about the meridian. Torque motor 8 is a conventional two-phase torque motor, its fixed phase being fed from the 400 cycle source of alternating current as shown in FIGURE 7. Thus, casing 2 is constrained to follow exactly the angular motion of gyroscope 11 about a vertical axis.

Figure 2:
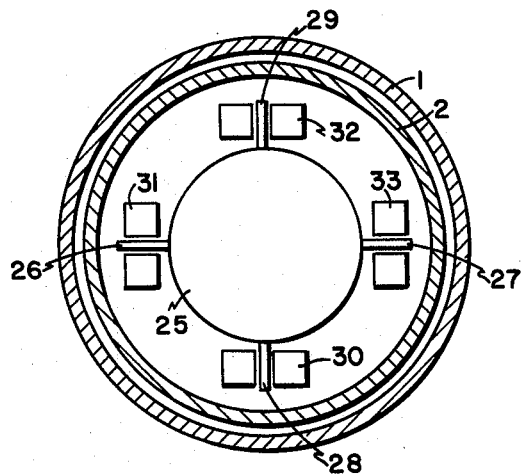
FIGURE 2 is a sectional view of the invention taken at 2—2 in FIGURE 1.
Figure 3:
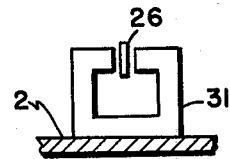
FIGURE 3 is a sectional view of the invention taken at 3—3 in FIGURE 1.
Figure 4:
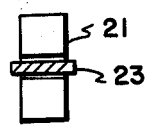
FIGURE 4 is a sectional view of the invention taken at 4—4 in FIGURE 1.

In case there is any tendency for gyroscope 11 to swing to and fro in pendulum fashion so that it describes essentially a movement in the vertical plane, damping vanes 26, 27, 28 and 29 come into play. These vanes are copper plates centered between the pole faces of their respective magnets shown in FIGURE 2. The vanes are purposely made larger than the pole faces of the magnets with which they are associated so that in the event the servo is not adjusted so as to keep the vanes entirely and exactly centered between the pole faces, the variation in flux cutting the copper plates is not sufficient to cause any error. The action of these vanes is simply that if they are displaced radially along their length, they cut lines of force of the magnetic field and generate currents which produce a reactive force opposing the motion, which force is proportional to the velocity of motion. Thus, the action of the vanes cannot prevent centering of the gyroscope, but do provide damping of any horizontal translational motion. In order that the vanes may be of maximum effectiveness for damping purposes, it is necessary that the distance between the magnetic pole faces be small and that the gap between the plates and either adjacent pole face be as small as is permitted by the resolution of the pick-off and torque motor servo, because, if one of the copper vanes actually touches the pole faces, the accuracy of the instrument may be impaired.

The read-out

Figure 6:
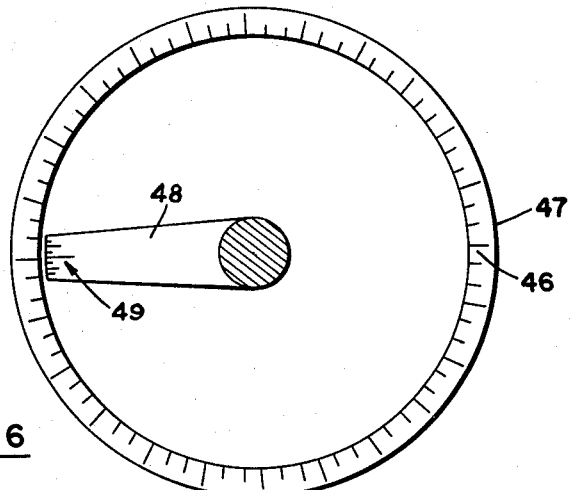
FIGURE 6 is a sectional view of the invention taken at 6—6 in FIGURE 5.

As previously discussed, the gyroscope tends to oscillate about the meridian. The problem then is one of relating the orientation of the spin axis of the gyroscope with the surrounding terrain. FIGURES 5 and 6 show a simplified read-apparatus, with the pointer 48 being directly connected through shaft 5 to the casing 2 which follows the movement of the gyroscope 11. If the observer continuously follows the pointer 48, it is possible for him to note the readings of scale 46 at the extreme excursions of the rotation about a vertical axis of gyroscope 11 and casing 2. After two such excursions, the angular position of the spin axis in its mean position can be determined, and this is the direction of the meridian. The theodolite is then lined up with the meridian using the scale 46 and the pointer 48 which is at right angles to the theodolite 50, and any angle may then be obtained by conventional surveying methods. Any number of more precise read-out devices may be used which contain optical lenses and vernier scales for accurate reading and positioning of the theodolite 50.

Accuracy improved

The accuracy of the gyroscope of this invention for the purpose of determining the earth's meridian is greatly improved over previously known instruments for the reason that the pick-off follow-up motor combination provides all of the power necessary to overcome the friction in bearings 3 and 4 which support the device, as well as the friction which necessarily occurs in connection with slip rings 9 which are needed to introduce power necessary for driving the gyroscope. Since no liquid is used, convection currents, of a kind to produce prohibitive error torques, are virtually eliminated. The use of hydrogen within the container as a medium provides much improved heat conduction over that which would be provided by air, and thus it is feasible to operate the gyroscope for the period necessary to obtain accurate reading without any danger of overheating or damaging the gyroscope.

Alternate damping

Figure 9:
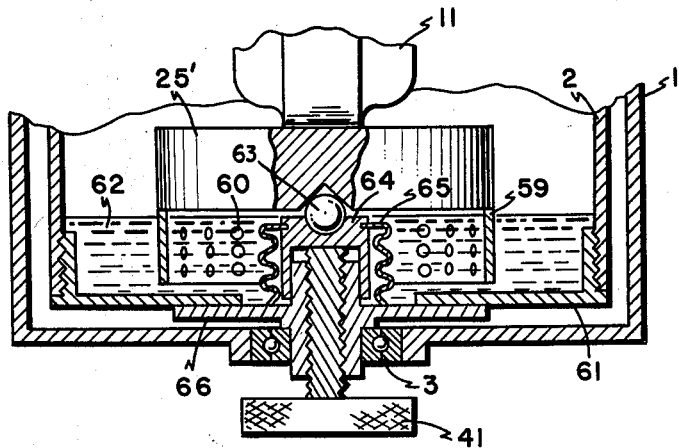
FIGURE 9 is an elevational view, partially in section, of a second embodiment of the invention.

FIGURE 9 shows an alternate method of damping the gyroscope in the vertical plane. An open end cylinder 59 having holes 60 through the walls therein is attached to the bottom of ballast 25' and the case 2 is provided with a removable bottom 61. Fluid 62 is added to the case with the cylinder 59 at least partially submerged in the fluid 62. A ball 63, ball seat 64, bellows 65, threaded portion 66 and screw 41 form the bottom "caging" means and fluid seal means. Since the case 2 follows the gyroscope's rotary motion, the fluid 62 must also follow the rotary motion of the gyroscope 11. The fluid 62 then does not provide any damping of the gyroscope 11 except at the reversal points of the rotary oscillations of the gyroscope 11, and then the inertia of the fluid tends to carry the gyroscope beyond the reversal point. However, because of the rotary oscillations of the gyroscope 11, the damping effect of the fluid 62 tends to cancel out when more than one rotary oscillation is made by the gyroscope 11. Lateral movement of the gyroscope 11 in a vertical plane relative to the case 2 is damped, however, because of the cylinder 59 moving through the fluid 62. The holes 60 in the cylinder 59 are optional and control the amount of damping in the vertical plane. A further means of controlling the damping is by the choice of fluid 62, size of the cylinder 59, and amount of cylinder 59 in the fluid. It is to be noted that if heater coils are used to control the temperature of the fluid 62, the effect of the convection currents is substantially eliminated because of the holes in the cylinder 59 and also because a limited amount of the cylinder is in the fluid 62.

Although the invention has been described and illustrated in detail, it is to be clearly understood that the same is by way of illustration and example only and is not to be taken by way of limitation, spirit and scope of this invention being limited only by the terms of the appended claims.

I claim:

1. In combination, a gyroscope having a spin axis, a container surrounding said gyroscope, means for supporting said container with angular freedom about a vertical axis, a thin metal wire band pendulously supporting said gyroscope within and from said container with the spin axis of said gyroscope in a horizontal orientation, a plurality of electrically conducting plates attached to said gyroscope and extending radially therefrom in a horizontal plane, a plurality of permanent magnets supported on the inner surface of said container and positioned to establish a magnetic flux path through said conducting plates to generate eddy currents in the said conducting plates upon horizontal translatory movement of said gyroscope in said container, pick-off means generating an electrical signal in response to relative rotation of said gyroscope and said container about a vertical axis, and servo means for rotating said container about a vertical axis in sense and magnitude sufficient to cause said relative rotation to remain essentially zero.

2. Means for determining the direction of the earth's meridian comprising a casing, means for supporting said casing with angular freedom about a vertical axis, a gyroscope within said casing, said gyroscope including a rotor, a stator, and electric motor means for rotating said rotor with respect to said stator, a thin band suspending said gyroscope pendulously by its stator within said casing from the upper interior surface thereof and with the spin axis of said gyroscope in a horizontal plane, a source of electrical power, power leads connected from said source to said electric motor means, pick-off means generating an electrical signal in response to relative rotation of said gyroscope stator and said casing about a vertical axis, servo means for causing said casing to rotate about a vertical axis and tending to keep the signal from said pick-off at zero, means for damping horizontal translational oscillations of said gyroscope within said casing, and means for measuring the angular position of said casing with respect to a line on the earth, whereby the rotation of the earth causes the axis of rotation of said gyroscope to tend to align itself with the earth's meridian fluid partially filling said casing and said means for damping horizontal, translational, oscillation of said gyroscope including an open-end cylinder attached to said gyroscope stator and extending into said fluid.

3. The device as claimed in claim 2 wherein said cylinder has holes through the wall thereof to permit the flow of fluid therethrough.

4. The device as claimed in claim 2 wherein said fluid level is below the gyroscope stator.

5. A device as recited in claim 3 and further comprising optical means for measuring the orientation of said frame with respect to the surrounding terrain.

6. In a meridian seeking gyroscopic instrument which includes a pendulously supported encased gyroscope supported by a metal wire suspension band, the combination comprising:
   (a) a container completely enclosing said encased gyroscope;
   (b) means for supporting said container with angular freedom about a vertical axis intersecting the spin axis of the encased gyroscope;
   (c) servo means to cause said container to follow any rotation of said encased gyroscope about said vertical axis thereby tending to eliminate twisting of the suspension band and consequent deleterious effect of the motion of said suspended encased gyroscope as said gyroscope oscillates about said meridian;
(d) pickoff means comprising
  (i) electromagnet means mounted on the case of said encased gyroscope
  (ii) coil means supported on said container and positioned in the magnetic field of said electromagnet means
said coil means providing a signal to said servo means upon angular displacement of said coil means from a predetermined position relative to said magnet means whereupon said servo means rotates said container so as to minimize the magnitude of said angular displacement and thereby substantially eliminating the twisting of said suspension band.

7. An instrument comprising in combination:
a housing;
a fluid-tight container mounted at two spaced-apart locations in said housing for freedom of motion about an axis of rotation;
a cased gyroscope;
a flexible suspension means having one end mounted on said container and the other end connected to said cased gyroscope for pendulously supporting said gyroscope within and from said container with the spin axis of said gyroscope in a substantially horizontal orientation, and wherein said axis of rotation of said container is substantially coaxial with a line passing through
  (a) the axis of said flexible suspension means at its point of mounting in said container and
  (b) the center of gravity of said cased gyroscope when said instrument is in its normal operating position;
pickoff means generating an electrical signal in response to rotation of said gyroscope relative to said container about said axis of rotation of said container;
servo means for causing said container to rotate about said axis of rotation and tending to keep the signal from said pickoff at zero and said band free from twisting and the consequent imposition of a restoring torque on said gyroscope as said gyroscope rotates about said axis of rotation.

8. The instrument of claim 7
wherein said pickoff means comprise
  (i) electromagnet means mounted on said gyroscope case
  (ii) coil means supported on said container and positioned in the magnetic field of said electromagnet means
said coil means providing a signal to said servo means upon angular displacement of said coil means from a predetermined position relative to said magnet means whereupon said servo means rotates said container so as to minimize the magnitude of said angular displacement.

9. An instrument comprising in combination:
a housing;
a fluid-tight container mounted at two spaced-apart locations in said housing for freedom of motion about an axis of rotation;
a cased gyroscope;
a flexible suspension means having one end mounted on said container and the other end connected to said cased gyroscope for pendulously supporting said gyroscope within and from said container with the spin of said gyroscope in a substantially horizontal orientation, and wherein said axis of rotation of said container is substantially coaxial with a line passing through
  (a) the axis of said flexible suspension means at its point of mounting in said container and
  (b) the center of gravity of said cased gyroscope when said instrument is in its normal operating position;
pickoff means generating an electrical signal in response to rotation of said gyroscope relative to said container about said axis of rotation of said container;
servo means for causing said container to rotate about said axis of rotation and tending to keep the signal from said pickoff at zero and said band free from twisting and the consequent imposition of a restoring torque on said gyroscope as said gyroscope rotates about said axis of rotation,
means for caging said cased gyroscope comprising:
  (i) first tubular means surrounding said suspension means and extending inwardly from said container and having an inner mating surface at its end;
  (ii) second tubular means surrounding said suspension means and extending from said cased gyro towards said first tubular means and having an outer mating surface at its end, the relative configurations of said first and second tubular means at said mating surfaces being such as to permit line contact between said inner surface and said outer surface when the two said surfaces are brought together; and
  (iii) plunger means mounted on said container on the lower side of said cased gyroscope opposite to said second tubular means, said plunger means being mounted for translatory movement so as to permit contacting said lower side of said cased gyroscope and moving same upward to a position wherein said first and second tubular means make contact at said mating surfaces, thereby caging said gyroscope.

10. An instrument comprising in combination:
a housing;
a fluid-tight container mounted at two spaced-apart locations in said housing for freedom of motion about an axis of rotation;
a cased gyroscope;
a flexible suspension means having one end mounted on said container and the other end connected to said cased gyroscope for pendulous supporting said gyroscope within and from said container with the spin axis of said gyroscope in a substantially horizontal orientation, and wherein said axis of rotation of said container is substantially coaxial with a line passing through
  (a) the axis of said flexible suspension means at its point of mounting in said container and
  (b) the center of gravity of said cased gyroscope when said instrument is in its normal operating position;
pickoff means generating an electrical signal in response to rotation of said gyroscope relative to said container about said axis of rotation of said container;
servo means for causing said container to rotate about said axis of rotation and tending to keep the signal from said pickoff at zero and said band free from twisting and the consequent imposition of a restoring torque on said gyroscope as said gyroscope rotates about said axis of rotation;
a plurality of electrically conducting plates attached to said gyroscope and extending radially therefrom in a horizontal plane;
a plurality of permanent magnets supported on the inner surface of said container and positioned to establish a magnetic flux path through said conducting plates to generate eddy currents in the said conducting plates upon horizontal translatory movement of said gyroscope in said container, thereby damping any such movement.

(References on following page)

References Cited by the Examiner

UNITED STATES PATENTS

| | | | |
|---|---|---|---|
| 1,074,771 | 10/13 | Bruger | 33—226 |
| 1,136,566 | 4/15 | Usener | 33—226 |
| 1,180,815 | 4/16 | Anschutz-Kaempfe | 33—226 X |
| 1,242,065 | 10/17 | Sperry | 33—226 |
| 1,378,296 | 5/21 | Tanner | 33—226 |
| 1,493,213 | 5/24 | Martienssen | 33—226 |
| 1,493,215 | 5/24 | Martienssen | 33—226 |
| 1,589,039 | 6/26 | Anschutz-Kaempfe | 33—226 |
| 1,707,475 | 4/29 | Henderson | 33—226 |
| 1,959,804 | 5/34 | Wittkuhns et al. | 318—31 |
| 2,269,453 | 1/42 | Gayhart. | |
| 2,419,948 | 5/47 | Haskins | 33—226 |
| 2,734,280 | 2/56 | Christoph | 33—226 |
| 2,735,052 | 2/56 | Fielden | 318—31 |

FOREIGN PATENTS

| | | |
|---|---|---|
| 524,459 | 5/21 | France. |
| 987,894 | 4/51 | France. |
| 842,272 | 12/52 | Germany. |

ROBERT B. HULL, *Primary Examiner.*

ISAAC LISANN, *Examiner.*